United States Patent [19]

Umeki et al.

[11] 4,321,302

[45] Mar. 23, 1982

[54] PROCESS FOR PRODUCING MAGNETIC POWDER HAVING HIGH COERCIVE FORCE

[75] Inventors: Shinji Umeki; Toshihiro Hamabata; Kazuaki Onuki; Kazuo Takada, all of Tokyo, Japan

[73] Assignee: TDK Electronics Co., Ltd., Tokyo, Japan

[21] Appl. No.: 143,514

[22] Filed: Apr. 24, 1980

[30] Foreign Application Priority Data

May 11, 1979 [JP] Japan .................... 54/57020

[51] Int. Cl.$^3$ .................... C01G 49/06; C01G 49/08
[52] U.S. Cl. .................... 428/404; 427/127; 252/62.56; 252/62.59; 428/693
[58] Field of Search .............. 252/62.56, 62.59, 62.62; 423/632, 633, 634; 428/404, 693; 427/127

[56] References Cited

U.S. PATENT DOCUMENTS

| | | | |
|---|---|---|---|
| 3,931,025 | 1/1976 | Woditsch et al. | 252/62.56 X |
| 4,082,905 | 4/1978 | Stephan | 252/62.56 X |
| 4,136,158 | 1/1979 | Okuda et al. | 423/634 X |
| 4,137,342 | 1/1979 | Kanten | 252/62.56 X |
| 4,201,761 | 5/1980 | Seitzer | 423/634 X |

*Primary Examiner*—Jack Cooper
*Attorney, Agent, or Firm*—Oblon, Fisher, Spivak, McClelland & Maier

[57] ABSTRACT

A magnetic iron oxide powder having high coercive force is produced by dispersing a magnetic iron oxide comprising a silicon component and a phosphorus component in an aqueous solution of a cobalt ion and adding a base to the dispersion to be an alkaline condition and heat-treating the dispersion whereby the cobalt ion is adsorbed and diffused in the surface layer of the magnetic iron oxide. A zinc component can be also incorporated in the crystal. The silicon component and the phosphorus component are preferably incorporated in the crystalline structure.

5 Claims, 1 Drawing Figure

PROCESS FOR PRODUCING MAGNETIC POWDER HAVING HIGH COERCIVE FORCE

BACKGROUND OF THE INVENTION

1. Field of the Invention

The present invention relates to a cobalt adsorbed magnetic iron oxide which has further improved coercive force.

2. Description of the Prior Arts

One of the inventors has reported magnetic powder having high coercive force which imparts excellent magnetic characteristics when it is used for a magnetic recording medium (Y. Imaoka, S. Umeki, Y. Kubota and Y. Tokuoka, "Characteristics of Cobalt adsorbed Iron Oxide Tapes", IEEE trans. magnetics, vol. MAG-14 No. 5, pp. 649–654, September 1978.

SUMMARY OF THE INVENTION

It is an object of the present invention to provide a process for producing a magnetic iron oxide powder having high coercive force with contributes for the improvement of characteristics of a magnetic recording medium.

The foregoing and other objects of the present invention have been attained by providing a process for producing a magnetic iron oxide powder by adsorbing and diffusing a cobalt ion in a surface layer of magnetite or γ-ferric oxide powder comprising silicon and phosphorus components which is obtained by a reduction of a hydrated iron oxide comprising the silicon and phosphorus components if necessary, further an oxidation thereof.

The hydrated iron oxide is preferably produced by incorporating a silicate and a phosphate in the aqueous solution of a base and mixing it with an aqueous solution of a ferrous ion and oxidizing the product under maintaining pH of the reaction mixture in a range of 5.5 to 7.5 during most of the oxidation.

The cobalt component is preferably incorporated by dispersing the magnetite or γ-ferric oxide comprising the silicon and phosphorus components in an aqueous solution of a cobalt ion and heat-treating the product.

BRIEF DESCRIPTION OF THE DRAWING

The FIGURE is a graph showing the relation of increase of the coercive force (Oe) and the specific surface area of $\gamma\text{-Fe}_2\text{O}_3(m^2/g)$.

DETAILED DESCRIPTION OF THE PREFERRED EMBODIMENTS

Figure 1:
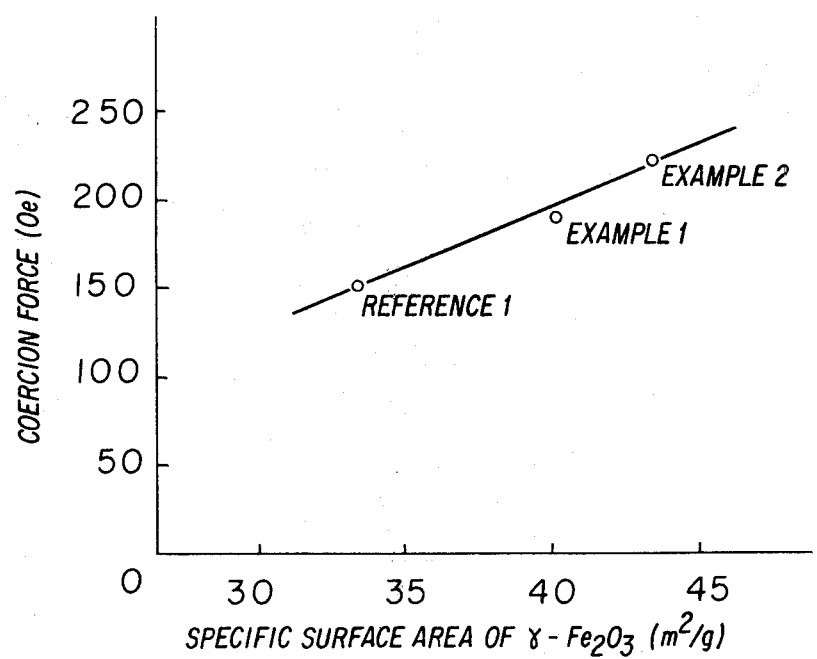

The aqueous solution of ferrous ion can be produced by dissolving a ferrous compound such as ferrous chloride, ferrous sulfate, ferrous nitrate etc. in water. A concentration of the ferrous compound is from a saturated concentration to 0.5 wt.% preferably 5 to 40 wt.% especially 10 to 30 wt.%.

The base is preferably sodium hydroxide, carbonate or bicarbonate or potassium hydroxide, carbonate or bicarbonate or ammonium hydroxide.

The concentration of the base is usually 1 to 40 wt.% preferably 5 to 30 wt.%.

The oxidizing agent can be alkali chlorates, air, oxygen, ozone and alkali nitrates. The oxidizing agent is added at a ratio of more than a stoichiometric amount for converting a ferrous compound into a ferric compound. The oxidizing agent can be added before, during or after the mixing of the aqueous solution of ferrous ion with the base, since the oxidation is performed after forming ferrous hydroxide. That is, the oxidizing agent can be mixed with the base or a slurry of ferrous hydroxide. The temperature for the oxidation is usually in a range of 0° to 80° C. preferably 5° to 60° C. especially 20° to 50° C.

The conventional air bubbling oxidation method can be also employed.

The preparation of a hydrated iron oxide can be modified as desired.

The hydrated iron oxide is converted into magnetite by a reduction and magnetite is converted into γ-ferric oxide by an oxidation. These products are called as the magnetic iron oxide powder.

The hydrated iron oxide is dehydrated by heating it.

The reduction of the hydrated iron oxide or the dehydrated iron oxide is usually carried out at 300° to 600° C. preferably 350° to 400° C. in hydrogen or at 400° to 700° C. in an inert gas with an organic compound such as alcohols, ketones, ethers, esters, hydrocarbons as a reducing agent. The oxidation of the product is usually carried out by heating at 200° to 350° C. preferably 250° to 300° C. in air.

The silicate is shown by the formula $$xM_2O \cdot ySiO_2$$

wherein M represents a metal preferably an alkali metal or ammonium group. When the silicate is dissolved in an aqueous solution of a base, the silicate is usually converted into an alkali silicate therefore any metal silicate can be used. The typical silicate is an alkali silicate such as sodium, potassium or ammonium silicate.

The phosphate can be orthophosphates, metaphosphates and polyphosphates. When the phosphate is dissolved in an aqueous solution of a base, the phosphate is usually converted into an alkali phosphate, therefore any metal phosphate can be used. The typical phosphate is an alkali phosphate such as sodium, potassium or ammonium phosphate.

The silicate is incorporated at a ratio of 0.05 to 10 wt.%, preferably 0.1 to 5 wt.% as Si based on iron oxide. The phosphate is incorporated at a ratio of 0.05 to 5 wt.%, preferably 0.1 to 2 wt.% as P based on iron oxide.

When a silicate and a phosphate are incorporated, P and Si are incorporated as parts of the crystalline structure of the hydrated iron oxide. This means P and Si are included in the crystal as substituents.

A magnetic iron oxide powder which is usually used for a magnetic recording medium is dispersed into an aqueous solution of a cobalt ion and a strong alkaline aqueous solution is added so as to give pH of higher than 12. The slurry is heated at about 100° C. for several hours and the product is washed with water, filtered and dried to obtain a magnetic powder having the coercive force of 550 to 570 Oe. The temperature dependency of the coercive force of the magnetic powder is excellent. When the magnetic powder is used for a magnetic recording medium, it is suitable for high density recording and it has excellent characteristics of a printing effect and an erasing characteristic and moreover, it has high durability to repeated applications and high stability to a long storage.

The particles of the magnetite obtained by a reduction of the hydrated iron oxide is usually has a length of 0.1 to 2μ preferably 0.2 to 1μ and an acicular ratio of 2 to 40 preferably 5 to 20.

When this treatment is applied for the hydrated iron oxide obtained by the basic process of the present invention in which the silicon and phosphorus components are incorporated inside of the crystal, the coercive force is further improved.

The important feature is further illustrated.

In usual, in a production of a magnetic powder having high coercive force by the above-mentioned process, $\gamma$-$Fe_2O_3$ or $Fe_3O_4$ is used as the source of iron oxide powder. When $Fe_3O_4$ is used as the source, the coercive force is slightly higher.

The inventors have further studied to impart higher coercive force and have found that high coercive force such as 600 to 700 Oe can be imparted by adsorbing a cobalt component on the surface layer of the iron oxide powder obtained by incorporating the silicon and phosphorus components in an iron oxide powder used as a source. It is preferable to incorporate more than 0.5% of $SiO_2$ component, more than 0.05% of P component and more than 1.0% of Co component in the iron oxide powder. This reason is not clarified. Thus, the result is remarkably effective for the high density recording in the magnetic recording system and the industrial advantage is remarkable.

The silicon and phosphorus components can be incorporated in the magnetic iron oxide powder by a desired process and preferably by adding a silicon source and a phosphorus source in the production of a hydrated iron oxide as a source of the magnetic iron oxide thereby comprising the silicon and phosphorus components in the crystalline structure of the hydrated iron oxide.

The hydrated iron oxide having silicon and phosphorus components is converted into magnetite or $\gamma$-ferric oxide which comprises the silicon and phosphorus components before dispersing it into an aqueous solution of cobalt ion.

The silicon and phosphorus components can be incorporated into the hydrated iron oxide before, during or after forming the hydrated iron oxide. When a silicate and a phosphate are incorporated before forming the hydrated iron oxide, the silicon and phosphorus components can be incorporated as parts of the crystalline structure. When a silicate and a phosphate are adsorbed after forming the hydrated iron oxide in an alkaline or neutral condition, the silicon and phosphorus components are incorporated in the surface layer of the hydrated iron oxide. It is also possible to incorporate a phosphate or a phosphoric acid in an acidic condition before, during or after forming the hydrated iron oxide and then, a silicate is incorporated in an alkaline condition.

The silicate is incorporated at a ratio of 0.05 to 10 wt.%, preferably 0.1 to 5 wt.% as Si based on iron oxide. The phosphate is incorporated at a ratio of 0.05 to 5 wt.% preferably 0.1 to 2 wt.% as P based on iron oxide.

The cobalt component is incorporated by adsorbing and diffusing into magnetite or $\gamma$-ferric oxide which comprises the silicon and phosphorus components by dispersing the latter in an aqueous solution of a cobalt compound such as cobalt chloride, cobalt sulfate, cobalt nitrate or cobalt complex. The concentration of the cobalt compound can be from a saturated concentration to 0.01%. The cobalt component is adsorbed by adding a base to the dispersion and is diffused by a heat treatment. The magnetite having the cobalt, silicon and phosphorus components can be converted into $\gamma$-ferric oxide by heating it in air at 200° to 350° C. preferably 250° to 300° C.

The present invention will be further illustrated by certain examples and references which are provided for purposes of illustration only and are not intended to be limiting the present invention.

EXAMPLE 1

Into 2.0 liter of a deionized water, 278 g. of ferrous sulfate was dissolved and the solution was stirred by a stirrer at a temperature of 25° C.±1.0° C. A half of a solution obtained by dissolving 80 g. of sodium hydroxide and 30 g. of potassium chlorate in 1.0 liter of a deionized water, was gradually added during about 1 minute to the former solution. During the addition, pH of the solution was suddenly increased from about 3.0 to about 7.5 and then pH was gradually decreased to about 6.1 after 15 minutes. After 30 minutes, a solution obtained by dissolving 3.0 g. of sodium silicate solution (about 28% of $SiO_2$ component) and 0.30 g. of sodium metaphosphate in said remained solution of sodium hydroxide and potassium chlorate was added to the reaction mixture at a rate of 2 ml. per minute by a pump. It took about 250 minutes for completing the addition. During the addition, the reaction mixture was stirred and the pH change of the reaction mixture was automatically recorded. After about 200 minutes, the pH was gradually increased to 6.4–6.5. The color of the precipitate was changed from blueish black to dark green and then further changed through yellowish blue to yellow. The end point of the reaction should be conformed with the addition of the stoichiometric quantity of the base required for neutralizing ferrous sulfate. In the practice, the pH change was monitored and controlled to give about 7.0 with a small amount of the aqueous solution of a base.

In this example, about 10 ml. of 2 N-NaOH aqueous solution was added 20 minutes before the end of the reaction so as to complete the reaction for 300 minutes. At the end of the reaction, the pH was 7.02. The resulting slurry of geothite was washed five times with water in a 100 liter tank by a decantation method, and then, it was filtered and dried at 70° C. for 24 hours and pulverized to obtain about 86 g. of goethite powder. It was confirmed that most of the powder was made of goethite ($\alpha$-FeOOH) by X-ray diffraction method. It was also confirmed that the powder was made of acicular crystals having an average length of about 0.3μ and an acicular ratio of about 10 by an electron microscopic observation. It was also confirmed that the powder had a specific surface area of 56.7 $m^2/g$. by the BET method. It was also confirmed tht the powder contains 0.85 wt.% of $SiO_2$ component and 0.15 wt.% of phosphorus component by the fluorescent X-ray elemental analysis.

In a quartz boat, 10 g. of the resulting goethite powder was charged and the port was set in a reducing furnace. Firstly, it was heated at about 600° C. in air for 1 hour to perform a dehydration and a heat treatment. (The heat treatment at 600° C. results in an improvement of crystalline state and an improvement of magnetic characteristics of $\gamma$-$Fe_2O_3$ obtained by a reduction and an oxidation of the product). Nitrogen gas was fed into ethanol in bubbling and was continuously fed into the reducing furnace at a flow rate of 0.3 liter/min. and the powder was reduced at 400° C. for 1 hour to obtain magnetite. The magnetite was cooled and then heated at 300° C. for 1 hour in air to obtain $\gamma$-ferric oxide.

Magnetic characteristics of the resulting γ-ferric oxide were measured. The results are as follows.

| | |
|---|---|
| Coercive force (Hc) | 465 Oe |
| Intensity of Saturated magnetization (sigma S) | 73.7 emu/g. |
| Intensity of Residual magnetization (sigma R) | 36.9 emu/g. |

The specific surface area measured by the BET method was 40.2 m$^2$/g.

According to an electron microscopic observation, it was confirmed that a sintering of the particles was not substantially found. The coercive force is varied depending upon a packing density and accordingly, it was calibrated to the value in the condition of 0.50 g/ml.

Ten grams of the resulting γ-ferric oxide containing silicon and phosphorus component was dispersed into about 300 ml. of a solution obtained by adding 5 ml. of 1 mole of aqueous solution of cobalt sulfate in 300 ml. of water. Then, 100 ml. of 6 N-aqueous solution of sodium hydroxide containing 0.2 g. of hydrosulfite as a reducing agent was added to the dispersion and the mixture was thoroughly stirred. After 30 minutes, it was heated and maintained at a temperature of 80° C.±1° C. for 60 minutes and then further heated to treat in the boiling state for 120 minutes, and then it was cooled. The product was washed with water and filtered and dried at 70° C. for 16 hours.

The product containing 2.9 wt.% of a cobalt component according to an analysis. Magnetic characteristics of the resulting product were measured. The results are as follows.

| | |
|---|---|
| Coercive force (Hc) | 672 Oe |
| Intensity of Saturated magnetization (sigma S) | 72.6 emu/g. |
| Intensity of Residual magnetization (sigma R) | 37.0 emu/g. |

Hydrosulfite was added to improve the coercive force.

EXAMPLE 2

In accordance with the process of Example 1, except adding 10 ml. of 1.0 mole aqueous solution of zinc chloride to the aqueous solution of ferrous sulfate, the reaction and the treatment were carried out under the same condition with the same components to obtain the goethite containing zinc component.

When zinc ion was added, the reaction velocity was slightly increased to complete the reaction for about 50 minutes shorter than that of Example 1. According to the electron microscopic observation, the size of the particles was slightly smaller than that of Example 1, and the acicular ratio of the particles was slightly higher than that of Example 1. The specific surface area measured by the BET method was 67.1 m$^2$/g.

In accordance with the process of Example 1, the product was dehydrated, reduced and oxidized to obtain γ-ferric oxide. Magnetic characteristics of the γ-ferric oxide are as follows.

| | |
|---|---|
| Coercive force (Hc) | 471 Oe |
| Intensity of Saturated magnetization (sigma S) | 73.3 emu/g. |
| Intensity of Residual magnetization (sigma R) | 36.5 emu/g. |

The specific surface area measured by the BET method was 43.5 m$^2$/g.

In accordance with the process of Example 1 except using the resulting γ-ferric oxide containing the zinc component and the silicon and phosphorus components, the cobalt ion was adsorbed and diffused on the surface layer of the γ-ferric oxide. Magnetic characteristics of the resulting product were as follows.

| | |
|---|---|
| Coercive force (Hc) | 695 Oe |
| Intensity of Saturated magnetization (sigma S) | 72.4 emu/g. |
| Intensity of Residual magnetization (sigma R) | 36.9 emu/g. |

REFERENCE 1

In accordance with the process of Example 1 except eliminating the sodium silicate solution and sodium metaphosphate from the aqueous solution of sodium hydroxide and potassium chlorate, the reaction and the treatment were carried out to obtain a goethite; and then the product was dehydrated, reduced and oxidized to obtain γ-ferric oxide, and magnetic characteristics of γ-ferric oxide were measured. The results are as follows.

| | |
|---|---|
| Coercive force (Hc) | 423 Oe |
| Intensity of Saturated magnetization (sigma S) | 75.6 emu/g. |
| Intensity of Residual magnetization (sigma R) | 38.1 emu/g. |

The specific surface area measured by the BET method was 32.7 m$^2$/g.

In accordance with the process of Example 1 except using the resulting γ-ferric oxide, the cobalt ion was adsorbed and diffused on the surface layer of the γ-ferric oxide. Magnetic characteristics of the resulting product were as follows.

| | |
|---|---|
| Coercive force (Hc) | 587 Oe |
| Intensity of Saturated magnetization (sigma S) | 74.9 emu/g. |
| Intensity of Residual magnetization (sigma R) | 37.8 emu/g. |

The FIGURE is a graph showing the relations of the specific surface area of γ-ferric oxide (γ-Fe$_2$O$_3$) and the increase of the coercive force (Hc) obtained in Examples 1 and 2 and Reference 1. As it is clearly found in the FIGURE, the product obtained in Example 1 (obtained by the process of the present invention) had more increase of coercive force than that of the product obtained in Reference 1 (no addition of a silicate and a phosphate in the production of goethite).

When the silicon and phosphorus components are incorporated, the specific surface area of γ-Fe$_2$O$_3$ is larger (this means to reduce the sintering phenomenon of the particles) whereby the cobalt ion is highly adsorbed and the coercive force is increased.

In Example 2, a small amount of the zinc component was added whereby the particle size of the goethite is smaller and the specific surface area is larger. Therefore, the effect for improving the coercive force is increased by the addition of the silicon and phosphorus components.

In Examples, the γ-ferric oxide (γ-$Fe_2O_3$) was used as the intermediate, however the same effect can be expected by using magnetite ($Fe_3O_4$).

We claim:

1. A magnetic iron oxide powder which consists essentially of:
   an iron oxide selected from the group consisting of magnetite and γ-ferric oxide;
   a silicon component in an amount of 0.05 to 10 wt %, as Si based on the iron oxide;
   a phosphorus component in an amount of 0.05 to 5 wt %, as P based on the iron oxide; and
   a cobalt component in an amount of at least 1.0 wt % as Co based on the iron oxide;
   wherein silicon and phosphorus are incorporated in the crystalline structure of the iron oxide and the cobalt component is diffused and adsorbed in the surface layer of the iron oxide.

2. The magnetic iron oxide powder according to claim 1, wherein the silicon component is present in an amount of 0.1 to 5 wt % as Si based on the iron oxide.

3. The magnetic iron oxide powder according to claim 1, wherein the phosphorus component is present in an amount of 0.1 to 2 wt % as P based on the iron oxide.

4. A process for producing a magnetic iron oxide powder which comprises: dispersing a magnetic iron oxide consisting essentially of an iron oxide selected from the group consisting of magnetite and γ-ferric oxide a silicon component, in an amount of 0.05 to 10 wt %, as Si based on the iron oxide, and a phosphorous component, in an amount of 0.05 to 5 wt %, as P based on the iron oxide, wherein silicon and phosphorus are incorporated in the crystalline structure of the iron oxide, in an aqueous solution of cobalt ion; adding a base to the dispersion so as to produce an alkaline condition; and, heating the dispersion so as to adsorb and diffuse the cobalt ion into the surface layer of the magnetic iron oxide.

5. The process according to claim 4, wherein the magnetic iron oxide powder that is dispersed in the aqueous solution of cobalt ion is produced by: adding an aqueous solution of a base containing silicate and phosphate to an aqueous solution of ferrous ion oxidizing the resulting admixture, while maintaining the pH of the admixture in the range of 5.5 to 7.5; recovering the resultant precipitate and then either reducing or reducing and reoxidizing the same.

* * * * *